United States Patent [19]

Azzam

[11] Patent Number: 5,337,146
[45] Date of Patent: Aug. 9, 1994

[54] DIFFRACTION-GRATING PHOTOPOLARIMETERS AND SPECTROPHOTOPOLARIMETERS

[75] Inventor: Rasheed M. A. Azzam, Metairie, La.

[73] Assignee: University of New Orleans, New Orleans, La.

[21] Appl. No.: 859,817

[22] Filed: Mar. 30, 1992

[51] Int. Cl.⁵ .............................................. G01J 4/00
[52] U.S. Cl. .................................... 356/367; 356/369; 250/225
[58] Field of Search .............................. 356/364–369, 356/351, 354; 250/225, 237 G

[56] References Cited

U.S. PATENT DOCUMENTS

| | | | |
|---|---|---|---|
| 4,030,835 | 6/1977 | Firester et al. | 356/354 |
| 4,158,506 | 6/1979 | Collett | 356/365 |
| 4,200,396 | 4/1980 | Kleinknecht et al. | 356/354 |
| 4,236,823 | 12/1980 | Roach et al. | 356/351 |
| 4,541,716 | 9/1985 | Crooks et al. | 356/354 |
| 4,681,450 | 7/1987 | Azzam | 356/367 |
| 4,725,145 | 2/1988 | Azzam | 356/367 |
| 5,081,348 | 1/1992 | Siddigui | 356/367 |
| 5,102,222 | 4/1992 | Berger et al. | 356/367 |

FOREIGN PATENT DOCUMENTS 2069691   8/1981   United Kingdom ................ 356/355

OTHER PUBLICATIONS

Applies Optics, "Edge-on diffraction of a Gaussian Laser Beam by a Semi-Infinite Plane", vol. 14, No. 5, May 1975, pp. 1156–1160, Otis et al.
IBM Technical Disclosure Bulletin, "Evaluation of Sinusoidally Varying Light Signals", vol. 24, No. 1B, Jun. 1981; pp. 541–542; Schedewie.

Primary Examiner—Richard A. Rosenberger
Assistant Examiner—Hoa Q. Pham
Attorney, Agent, or Firm—D'Alessandro, Frazzini & Ritchie

[57] ABSTRACT

A division-of-amplitude photopolarimeter based on conical grating diffraction includes a diffraction grating and at least four photodetectors. An incident light beam is directed at the grating at an oblique incidence angle $\Phi$ and the grating grooves are inclined at an arbitrary angle $\alpha$ with respect to the plane of incidence. Each of the photodetectors is positioned to intercept one of the diffracted orders and may be an area array detector if spectropolarimetry use is desired. Polarizing means may be inserted in the paths of one or more of the diffracted orders. A division-of-amplitude photopolarimeter based on planar grating diffraction includes a diffraction grating and at least four photodetectors; the grating is placed in the conventional spectrometer orientation with its grating grooves perpendicular to the plane of incidence. Each of the photodetectors is positioned to intercept one of the diffracted orders, all of which lie in the plane of incidence and may be a linear array detector if spectropolarimetry use is desired. Polarizers are inserted in the paths of at least two of the diffracted orders between the grating and the detectors.

15 Claims, 7 Drawing Sheets

DIFFRACTION-GRATING PHOTOPOLARIMETERS AND SPECTROPHOTOPOLARIMETERS

BACKGROUND OF THE INVENTION

1. Field of the Invention

The present invention relates to photopolarimeters. More particularly, the present invention relates to Stokes-parameter polarimeters and spectrophotopolarimeters utilizing grating diffraction.

2. The Prior Art

Optical polarimetry is a field of vast scope and encompasses any type of optical measurement where light polarization plays an essential role, or where wave polarization itself is a carrier of information. Optical polarimetry particularly refers to the measurement of the state of polarization of light which is emitted from various sources, over a wide range of wavelengths, or which is scattered by different objects. The light sources may range from minute atomic samples to entire galaxies; and the objects may range from atoms, molecules, or microscopic samples to whole planets.

For example, ellipsometry, a branch of optical polarimetry which deals with surface and thin-film characterization by polarized-light reflection, is alone the subject of several monographs and a series of international symposia with five volumes of published proceedings. In astronomy, measurement of polarization of light, both emitted and scattered, is finding broad application for deducing microstructure of particles and macrostructure of atmospheres. Spectrophotopolarimetry has also been the main tool of mapping solar magnetic fields. Other subspecialties of optical polarimetry have witnessed similar expansion.

Many photopolarimeters have been devised to measure light polarization. For example, see P. S. Hauge, Recent Developments in Instrumentation in Ellipsometry, Surf. Sci., Vol. 96, pp. 108-140 (1980), and K. Serkowski, Polarimeters for Optical Astronomy, in Planets, Stars, and Nebulae Studied With Photopolarimetry, T Gehrels, Ed., U. of Arizona Press, Tucson 1974, pp. 135-174. A typical photopolarimeter instrument employs a single linear photodetector in front of which are placed polarizing optical elements one or more of which are subjected to some form of modulation (e.g. synchronous rotation or phase modulation). The output signal from the photodetector is Fourier analyzed to extract the four Stokes parameters of incident light as described in R. M. A. Azzam, Measurement of the Stokes parameters of light: a unified analysis of Fourier photopolarimeters, Optik, Vol. 52, pp. 253-256 (1979).

At least one photopolarimeter instrument permits the simultaneous measurement of all four Stokes parameters of light with no moving parts or modulators and requires a multichannel scheme with four (or more) detectors. This prior art photopolarimeter instrument, disclosed in R. M. A. Azzam, Arrangement of four photodetectors for measuring the state of polarization of light, Optics Lett., Vol. 10, pp. 309-311 (1985), and U.S. Pat. No. 4,681,450, issued Jul. 21, 1987, uses a spatial arrangement of four photodetectors (of which three are reflective) and no other optical components. This four-detector photopolarimeter has been implemented successfully and studied extensively and is being commercialized by Research Corporation Technologies of Tucson, Ariz.

The four-detector photopolarimeter is spectroscopic only in the sense that it can be operated over a range of wavelengths, but with light of only one wavelength incident on the four-detector photopolarimeter at a time. Therefore, the four-detector photopolarimeter is not capable of kinetic polarization analysis as a function of wavelength of incident broadband radiation. Such capability would be useful, for example, in spectroscopic ellipsometry of fast-changing physicochemical reactions on surfaces. The growing importance of this technique is underscored by the announcement of the First International Conference on Spectroscopic Ellipsometry to be held in Paris in January, 1993.

Other multichannel photopolarimeter schemes, such as those disclosed in E. Collett, Determination of the ellipsometric characteristics of optical surfaces using nanosecond laser pulses, Surf. Sci., Vol. 96, pp. 156-167 (1980), and R. Cross, B. Heffner, and P. Hernday, Polarization measurement goes automatic, Lasers and Optronics, Vol. 10, No. 11, pp. 25-26 (1991), employ the division of wavefront. Others, including R. M. A. Azzam, Division-of-amplitude photopolarimeter (DOAP) for the simultaneous measurement of all four Stokes parameters of light, Optica Acta Vol. 29, pp. 685-689 (1982) and R. M. A. Azzam, Beam-splitters for the division-of-amplitude photopolarimeter, Optica Acta, Vol. 32, pp. 1407-1412 (1985) employ the division of amplitude. In the division-of-amplitude photopolarimeter, an incident light beam, whose four Stokes parameters are to be measured, is split into four beams using an appropriately coated beam splitter and two Wollaston prisms (or equivalent birefringent or multi-layer-coated polarizing beam splitters). Linear detection of the light fluxes of the four component beams produces four output electrical signals that determine the four Stokes parameters via an instrument matrix which is obtained by calibration. The division-of-amplitude photopolarimeter is capable of fast (time-resolved) measurement of the most general state of partial elliptical polarization of light as it employs no moving parts or modulators. A variant of division-of-amplitude photopolarimeter is reported in G. E. Jellison, Four-channel polarimeter for time-resolved ellipsometry, Opt. Lett., Vol. 12, pp. 766-768 (1987), and three instruments based on the description in R. M. A. Azzam, , Division-of-amplitude photopolarimeter (DOAP) for the simultaneous measurement of all four Stokes parameters of light, Optica Acta, Vol. 29, pp. 685-689 (1982), have been operated recently as reported in K. Brudzewski, Static Stokes ellipsometer: General analysis and optimization, J. Mod. Opt., Vol. 38, pp. 889-896 (1991); S. Krishnan, Intersonics, Inc, (Northbrook Ill.) and J. Morel, Université de Neuchâtel (Switzerland).

Diffraction gratings have had a major impact on spectroscopic science and technology since their advent by Joseph Fraunhofer in 1821, who used them to measure the absorption lines of the solar spectrum. Grating diffraction has been central to spectroscopy and its many applications in virtually every branch of science and technology. An indication of their pervasive use as the dominant dispersive device in spectroscopic instruments is the claim by Bausch & Lomb (now Milton Roy) that its diffraction gratings are now used almost exclusively in hundreds of thousands of spectrophotometers and monochromators all over the world. The 1991 Physics Today Buyer's Guide lists over 30 companies that manufacture and/or sell ruled and holographic diffraction gratings. Gratings have also proved to be some of the most versatile optical science and engineering tools, finding use as waveguide couplers, wavelength division multiplexers and demultiplexers, distributed feedback elements in lasers, and holographic beam deflectors, combiners, and interconnects for optical computers.

Polarization effects that accompany grating diffraction have been known since they were first discovered by Fraunhofer. However, these effects are generally thought of as spurious and have generally not been put to practical use. A notable exception is that of the non-diffracting wire-grid polarizer which is used to linearly polarize infrared radiation (and other longer-wavelength electromagnetic waves) by the differential absorption of the component waves of incident light whose electric vectors oscillate parallel and perpendicular to the wires.

A recent paper by Todorov and Nikolova, Spectrophotopolarimeter: fast simultaneous real-time measurement of light parameters, Opt. Lett., Vol. 17, No. 5, pp. 358–359, March 1992, describes a spectrophotopolarimeter utilizing two transmission gratings in series. The first of these gratings is presumed not to change the state of polarization of light (an unrealistic assumption) and the second grating is a nonconventional one which uses the superposition of orthogonally circularly polarized waves in a photodichroic material, a grating which, to the knowledge of the present inventor, only the authors of this paper have fabricated. This reference is believed by the inventor to be the closest prior art to the present invention.

BRIEF DESCRIPTION OF THE INVENTION

A Stokes-parameter spectropholotpolarimeter according to the present invention utilizes a diffraction grating to provide in combination the beam-splitting, dispersive, and polarization-altering functions in combination with presently available high-resolution photodetector arrays. The present invention described herein is intended to broaden the domain of use of diffraction gratings to include spectroscopic polarimetry and spectroscopic ellipsometry. In the present invention, grating diffraction is used for polarization analysis or optical polarimetry. In particular, when a grating is set for planar or conical diffraction and detector arrays intercept four or more diffracted orders as disclosed herein, the polarizing and dispersive properties of the grating permit time-resolved 'Strokes'-parameter spectrophotopolarimetry, without the use of any moving optical elements or polarization modulators. It is the belief of the inventor that this is not possible with any other polarimetric scheme.

According to a first aspect of the present invention, a division-of-amplitude photopolarimeter based on conical grating diffraction includes a diffraction grating and at least four photodetectors. An incident light beam is directed at the grating at an oblique incidence angle $\Phi$ and the grating grooves are inclined at an arbitrary angle $\alpha$ with respect to the plane of incidence. Each of the photodetectors is positioned to intercept one of the diffracted orders, all of which are generators of a cone. Polarizing means may be inserted in the paths of one or more of the diffracted orders.

According to a second aspect of the present invention, a division-of-amplitude photopolarimeter based on planar grating diffraction includes a diffraction grating and at least four photodetectors. The grating is placed in the conventional spectrometer orientation with its grating grooves perpendicular to the plane of incidence. Each of the photodetectors is positioned to intercept one of the diffracted orders, all of which lie in the plane of incidence. Polarizing means are inserted in the paths of at least two of the diffracted orders.

The instrument described herein is capable of time-resolved and spectral measurements of the state of polarization light without the use of any moving parts or modulators if area detectors and linear detectors are employed. The existence of extra diffracted orders beyond the required minimum of 4 increases the accuracy with which the Stokes vector is determined from redundant projections.

Furthermore, self alignment of the Stokes-parameter spectropholotpolarimeter of the present invention is facilitated by autocollimation or by using a position-sensing (quadrant) detector to intercept one of the extra diffracted beams. Thus the positioning of the instrument relative to an incoming beam can be reproduced accurately between calibration and measurement. The flexibility and control that are available in the production of gratings of the desired spatial frequencies, groove shapes, and coating materials can be utilized to optimize the performance of the grating photopolarimeter. Furthermore, the control of grating substrate curvature adds an imaging feature to the polarimeter not found in other polarimeter designs.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Throughout this disclosure, reference is made to prior art publications for the purpose of demonstrating that techniques described herein are known to those of ordinary skill in the art. Each of these prior art publications cited herein is expressly incorporated herein by reference.

Figure 1:
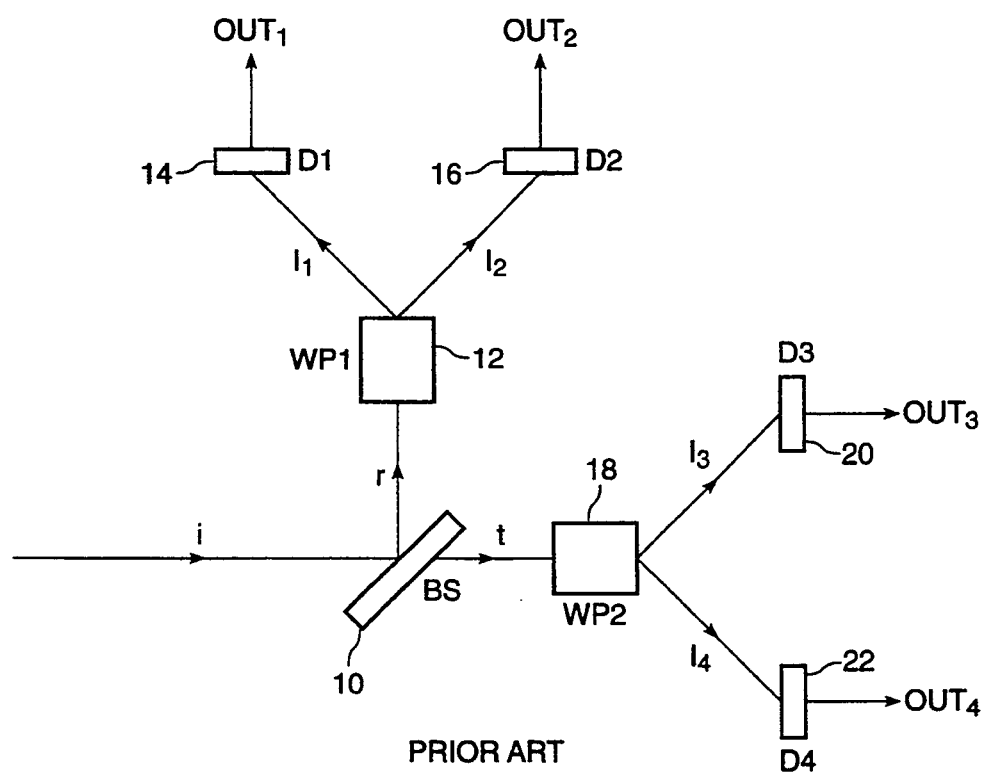
FIG. 1 is a diagram of a prior art division-of-amplitude photopolarimeter.

Referring first to FIG. 1, a prior art Stokes-parameter division-of-amplitude photopolarimeter of the type disclosed in R. M. A. Azzam, Division-of-amplitude photopolarimeter (DOAP) for the simultaneous measurement of all four Stokes parameters of light, Optica Acta, Vol. 29, pp. 685–689 (1982) is diagrammatically shown. It comprises a beam splitter 10 placed in the path of an incident beam of light i. The beam splitter 10 creates a transmitted beam t and a reflected beam r. Reflected beam r is directed through a first Wollaston prism 12 (or equivalent birefringent or multilayer-coated polarizing beam splitter) which divides it into first and second light flux components $i_1$ and $i_2$. The first and second light flux components $i_1$ and $i_2$ are detected by first and second linear photodetectors 14 and 16, which produce resulting first and second electrical output signals. Similarly, transmitted beam t is directed through a second Wollaston prism 18 which divides it into third and fourth light flux components $i_3$ and $i_4$. The third and fourth light flux components $i_3$ and $i_4$ are detected by third and fourth linear photodetectors 20 and 22, which produce resulting third and fourth electrical output (current) signals. The four electrical output signals are used to determine the Stokes parameters of the light beam as disclosed in the reference.

The fact that a diffraction grating produces multiple beams from an incident beam and the significant polarization effects that are known to accompany grating diffraction make the grating a specially suited element for a division-of-amplitude photopolarimeter. This diffraction grating property has been utilized in the present invention. The diffraction grating photopolarimeters of the present invention belong to the division of amplitude class of multichannel devices.

Figure 2:
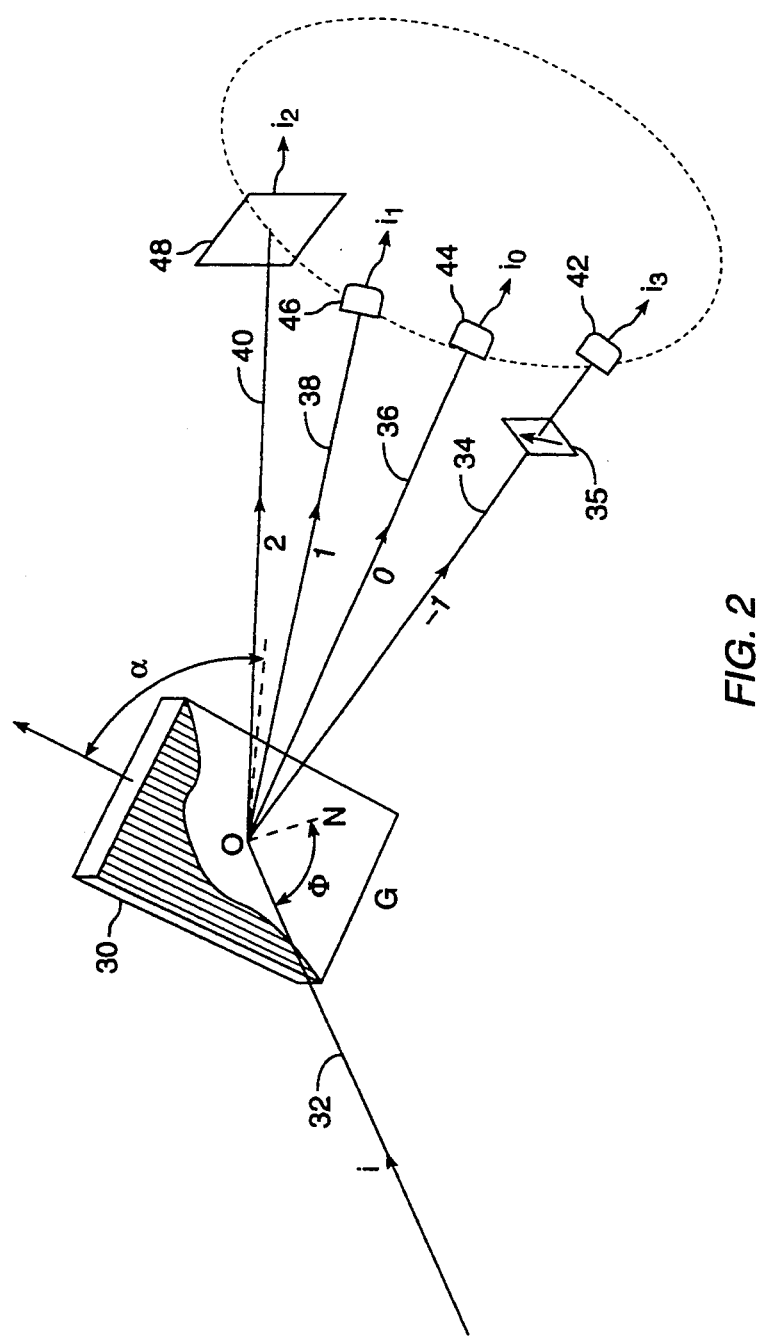
FIG. 2 is a diagram of a division-of-amplitude photopolarimeter based on conical grating diffraction according to a first aspect of the present invention.

According to a first aspect of the present invention, a Stokes-parameter spectropholotpolarimeter is based on conical grating diffraction. Referring now to FIG. 2, a schematic diagram of a grating-based division-of-amplitude photopolarimeter embodiment of the invention is presented. A metallic reflection diffraction grating 30 breaks the incident light beam 32 of Stokes vector:

$$\underline{S} = [S_0 S_1 S_2 S_3]^t$$

where t indicates the transpose, into at least four diffracted orders $O_{-1}$, $O_0$, $O_1$, and $O_2$, indicated at reference numerals 34, 36, 38 and 40, respectively. Although a diffraction grating 30 is indicated throughout this disclosure as a reflection grating, such as a metal-coated holographic grating, available from Spectrogon, of Secaucus, N.J., it should be evident to those of ordinary skill in the art that the invention is equally workable with other equivalent periodic transmissive or reflective structures.

To make the diffraction efficiency of each diffracted order $O_{-1}$, $O_0$, $O_1$, and $O_2$ sensitive to the Stokes parameters $S_2$ and $S_3$, the grating 30 is oriented for oblique incidence at an angle $\Phi$ and the grating lines are inclined at an arbitrary angle $\alpha$ with respect to the plane of incidence as shown in FIG. 2. Angle $\Phi$ must be greater than 0° and actual embodiments have used angles between about 45° and 65°. The angle $\alpha$ must be greater than 0° and less than 90°, and may preferably be between about 30° and 60°. A presently preferred angle is about 45°. The line O-N indicates the grating normal at the point of incidence O.

In the conventional (spectrometer) orientation of the grating with the lines normal to the plane of incidence ($\alpha = 90$ degrees), the diffraction efficiency becomes independent of $S_2$ and $S_3$ and the photopolarimeter of this embodiment cannot function as a complete polarimeter unless appropriately oriented polarizers are inserted in two or more diffracted beams.

The four diffracted orders 34, 36, 38 and 40 are intercepted by photodetectors 42, 44, 46, and 48, placed in their respective paths. According to a presently operating embodiment of the invention, all of photodetectors 42, 44, 46, and 48 comprise PIN photodetectors, such as PIN-10DP, available from UDT of Hawthorne, Calif. If an instrument having a response over a selected range of wavelengths is desired, photodetectors 42, 44, 46, and 48 may all comprise area photodetector arrays, such as CCD arrays. An exemplary CCD area array is shown as the photodetector 48. Each CCD array should be oriented such that the diffracted orders from each wavelength within the entire range of desired input light wavelengths will fall on the array. In this manner, the diffracted orders from different incident wavelengths will be mapped into different points on the surface of the CCD array. It will be understood by those of ordinary skill in the art that the instrument must be calibrated over the wavelength range of interest using a polarization state generator which need not be perfect. According to a presently preferred embodiment of the present invention, linear polarizer 35 may be disposed between grating 30 and detector 42. Additional polarizers may be similarly disposed in front of other detectors 44, 46 and 48 as desired.

The configuration of conical diffraction without the use of any additional polarizers will first be considered. The m-th diffracted beam is intercepted by a linear photodetector $D_m$ (which may be an element of an area array) and generates an output electrical signal $i_m$ (m = 0, 1, 2, ..., M-1) which is proportional to the power carried by that order. The output current signal $i_m$ of the m-th detector is a linear combination of the four Stokes parameters of the incident light, i.e., $$i_m = \sum_{n=0}^{3} a_{mn} S_n, \quad m = 0, 1, 2, \ldots, M - 1 \quad (1)$$

The m-th projector vector $(a_{m0}\, a_{m1}\, a_{m2}\, a_{m3})$ is determined by the first row of the Mueller matrix of diffraction of the mth order multiplied by a scale factor that represents the sensitivity of the photodetector $D_m$.

When only four orders are detected, the corresponding set of 4 signals $i_m$, m = 0, 1, 2, and 3, define a current vector $\underline{I} = [i_0\, i_1\, i_2\, i_3]^t$ which is linearly related to the input Stokes vector $\underline{S}$ by $$\underline{I} = \underline{A}\,\underline{S} \quad (2)$$

The 4×4 instrument matrix $\underline{A} = (a_{mn})$ is characteristic of this photopolarimeter at a given wavelength. For a given grating, $\underline{A}$ is a function of the selected diffracted orders (if more than four are available), the angular orientation parameters $\Phi$, $\alpha$ and the wavelength of light. When $\alpha \neq 0$, i.e. for an arbitrary orientation that produces conical diffraction, $\underline{A}$ is in general nonsingular. From Eq. (2) $\underline{A}$ is then given by $$S = A^{-1} I \quad (3)$$

The instrument matrix A of this photopolarimeter is determined by calibration using the procedures established for the four-detector photopolarimeter and described in R. M. A. Azzam and A. G. Lopez, Accurate calibration of the four-detector polarimeter with imperfect polarizing optical elements, J. Opt. Soc. Am. A, Vol. 6, pp. 1513–1521 (1989).

Figure 3:
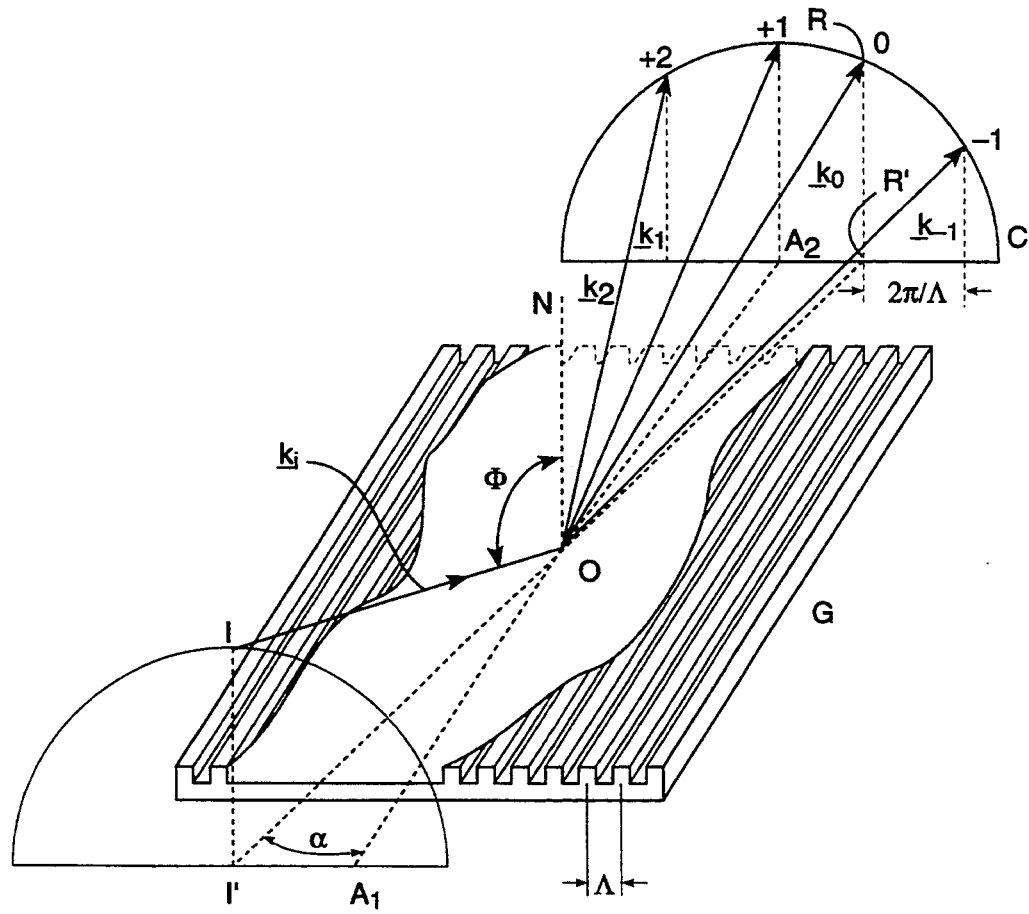
FIG. 3 is a graphical construction showing the determination of the wave vectors of the various diffracted orders under conditions of conical diffraction in a division-of-amplitude photopolarimeter such as that of FIG. 2.

FIG. 3 illustrates the graphical construction which may be used to determine the wave vectors of the various diffracted orders of the incident beam 32 under conditions of conical diffraction from grating 30. As can be seen from FIG. 3, the plane of incidence of the incident beam may be defined by I-O, a line defining the path of the incident beam 32 to point O (also the incident wave vector $k_i$), the point of incidence of the incident beam 32 on grating 30, and line I-I', a line from point I parallel to line O-N, the normal to the grating surface at the point of incidence. The line I'-O forms an angle $\alpha$ with the line $A_1$-$A_2$, a line through O parallel to the grooves of the grating 30. The 0th order diffraction lies in the plane of incidence as shown by the extension of line I'-O to R' (I'-O-R') and the path of the 0th order beam represented by line O-R, the wave vector of the 0th order $k_0$. Line R-R' is parallel to normal O-N.

Those of ordinary skill in the art will appreciate that the angle which the 0th order diffracted beam makes with normal O-N is equal to the angle that incident beam I-O makes with normal O-N, thus $\angle NOR = \angle NOI$. Point R lies on the surface of a cone of which all diffracted orders are generators, as illustrated by the semicircle C. This is the circle of intersection of a sphere, with its center at O and having a radius equal to $2\pi/\lambda$, where $\lambda$ is the wavelength of the incident light, and the plane through R perpendicular to the grating grooves.

R' lies along the diameter of semicircle C and may be used as a starting point to determine the locations on the circumference of semicircle C of the remaining diffracted orders. The diffracted orders will lie on the circumference at locations intersected by chords orthogonal to the diameter of the semicircle C and passing through points on the diameter separated from R' by integral multiples of the distance $2\pi/\Lambda$, where $\Lambda$ is inter-groove spacing of the diffraction grating 30.

Figure 4:
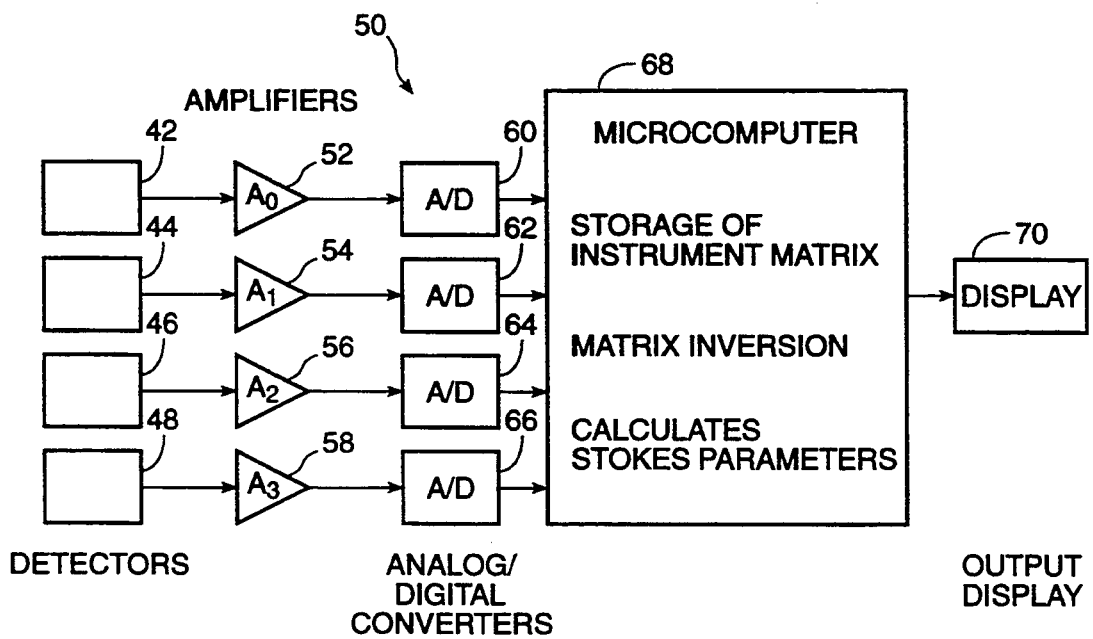
FIG. 4 is a block diagram of a signal processing system suitable for use with the division-of-amplitude photopolarimeters of the present invention.

Referring now to FIG. 4, a block diagram for a signal processing system 50 for use with the division-of-amplitude photopolarimeters of the present invention is shown. Signal processing system 50 includes amplifiers 52, 54, 56, and 58, having inputs connected, respectively, to the outputs of photodetectors 42, 44, 46, and 48. Amplifiers 52, 54, 56, and 58 may be operational amplifiers which may be discrete operational amplifiers or may be integral with the photodetectors. The selection of amplifiers 52, 54, 56, and 58 is a matter of simple design choice for one of ordinary skill in the art.

The outputs of amplifiers 52, 54, 56, and 58 are connected to the inputs of analog-to-digital (A/D) converters 60, 62, 64, and 66, respectively. The purpose of A/D converters 60, 62, 64, and 66 is to digitize the output signals from photodetectors 42, 44, 46, and 48 for use by signal processing system 50.

As presently contemplated, A/D converters 60, 62, 64, and 66 may have a resolution of 12 bits, equivalent to one part in 4096. The outputs of A/D converters 60, 62, 64, and 66 are used by microcomputer 68, which may be an IBM compatible, Apple, or other general purpose computer.

Computer 68 may be appropriately programmed to store the instrument matrix determined by calibration, perform matrix inversion, and calculate the Stokes parameters. Computer programs to perform these tasks are easily provided by those of ordinary skill in the art, to whom provision of such programs are routine tasks.

The results of the calculations performed by computer 68 may be presented on display 70 or produced in other output forms, such as by printer. These output devices, and their operation, are well known in the data processing art.

The validity of the basic principle of the photopolarimeter of this embodiment of the invention has been verified experimentally by using an Al-coated 600-grooves/mm holographic grating set at 45° angle of incidence with the grooves inclined at 45° with respect to the plane of incidence. A He-Ne laser of 633 nm wavelength was used as the source and small-area PIN photodiodes with integral adjustable-gain operational amplifiers were used as detectors. The grating diffracted three orders (out of the plane of incidence) plus the specular 0th order beam, for a total of four. Calibration was carried out using the method described in R. M. A. Azzam and A. G. Lopez,, Accurate calibration of the four-detector polarimeter with imperfect polarizing optical elements, J. Opt. Soc. Am. A , Vol. 6, pp. 1513–1521 (1989), and the resulting instrument matrix is given below $$A = \begin{matrix} 3.096 & 0.875 & -2.807 & -0.190 \\ 3.219 & -0.166 & 1.163 & 0.552 \\ 2.449 & -0.325 & 1.490 & 0.100 \\ 2.000 & -0.320 & 1.587 & 0.112 \end{matrix} \quad (4)$$

Figure 5:
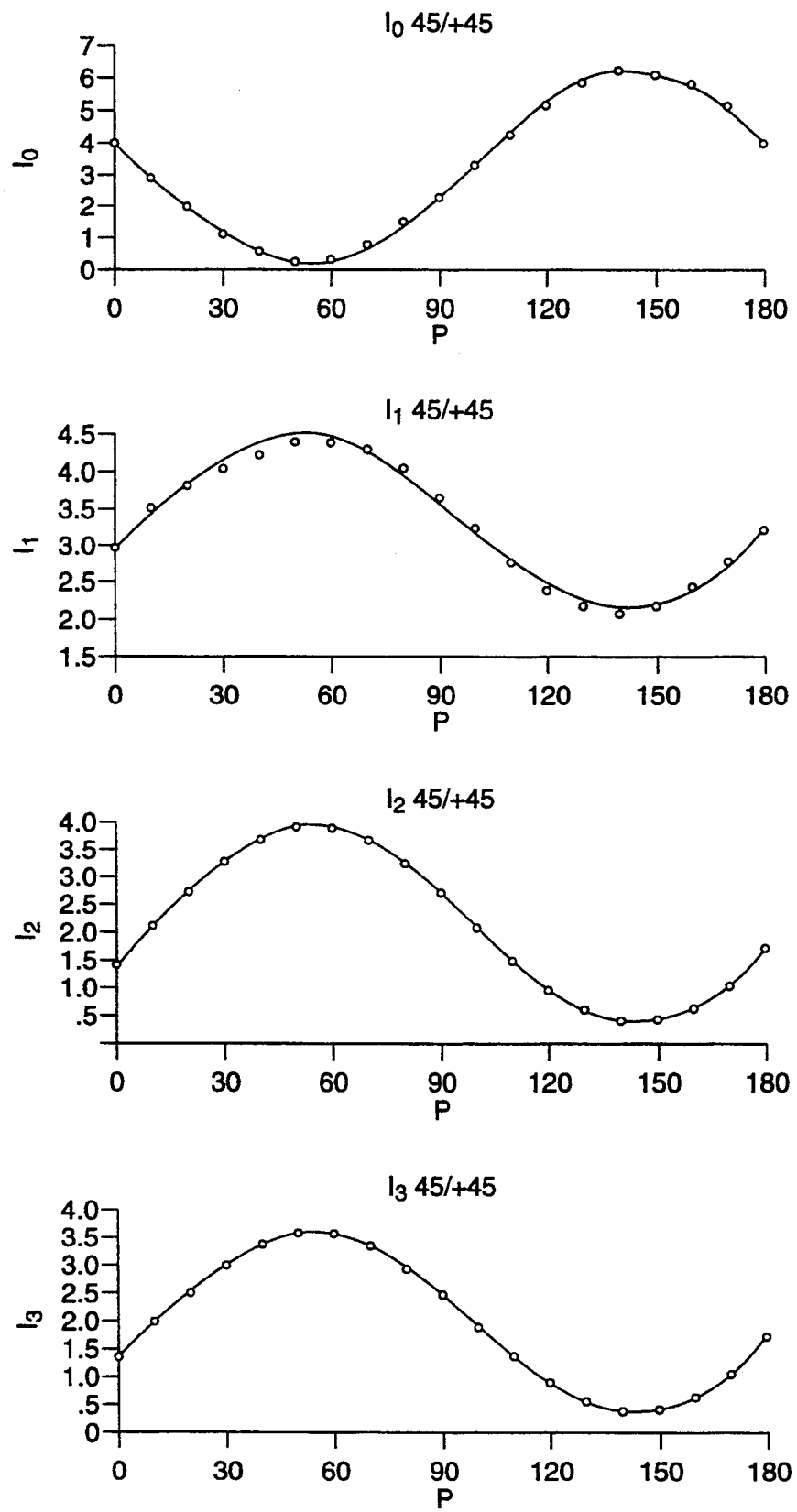
FIG. 5 is a representation of the results of the calibration procedure which determined the first three columns of the instrument matrix A of an actual conical-grating-diffraction division-of-amplitude photopolarimeter constructed in accordance with FIG. 2.

The experimental data that determined the first three columns of A is shown graphically in FIG. 5. The determinant of the matrix of Eq. (4) equals $-0.250$ and the matrix is not nearly singular. For comparison, the determinant of A in the singular orientation $\alpha = 90°$ is found experimentally to be 3 orders of magnitude lower.

As described by analogy in R. M. A. Azzam, Instrument matrix of the four detector photopolarimeter: physical meaning of its rows and columns and constraints on its elements, J. Opt. Soc. Am. A, Vol. 7, pp. 87–91 (1990), a measure of the polarization sensitivity of the individual diffracted orders may be given by the lengths of the normalized projection vectors (NPVs). From Eq. (4)

$$|a_0| = 0.951, \ |a_1| = 0.403, |a_2| = 0.623, |a_3| = 0.811 \quad (5)$$

Thus the 0th and 3rd orders are more polarization sensitive than the 1st and 2nd orders. (The upper limit on the length of a NPV is 1 and occurs only if the grating accidentally totally polarizes one of the diffracted orders.) The collective polarimetric sensitivity of all orders is limited by the small volume of the pyramid whose vertices are the endpoints of the four NPVs $a_m$ (m = 0, 1, 2, 3). The polarimeter of this embodiment of the invention using conical diffraction without additional polarizers is suited mainly for totally polarized light or partially linearly polarized light.

The photopolarimeter of this embodiment of the invention offers considerable advantages and flexibility. First, in common with division-of-amplitude photopolarimeter and the four-detector photopolarimeter, the photopolarimeter of this embodiment of the invention has no moving parts or modulators, hence it is capable of time-resolved polarization measurements with a speed which is limited only by the photodetectors and associated electronics. As those of ordinary skill in the art will readily appreciate, the performance of the instrument can be optimized at a given wavelength by controlling the groove shape, the orientation angles $\alpha$ and $\Phi$, and by applying thin-film dielectric coatings on the grating surface. The polarization sensitivity of the photopolarimeter can also be substantially improved by the insertion of linear (e.g. dichroic sheet) polarizers in front of the respective detectors. This, in effect, lengthens each NPV to nearly the maximum value of 1 and increases the determinant of the instrument matrix. The orientations of the polarizers can be chosen to optimize the performance over a given wavelength range.

By choosing a grating with a lower spatial frequency (e.g., 100–300 g/mm for visible light), a number of beams $M > 4$ (distributed around a cone with apex at the point of reflection) becomes available. When each beam is intercepted with a photodetector, M output signals, representing M projections of the stokes vector S are obtained. With these additional (redundant) projections, a more accurate and precise estimate of S can be determined. In this case, Eq. (2) still holds except that I is now an $M \times 1$ vector and A is an $M \times 4$ rectangular matrix ($M > 4$). A least-squares solution for S is given by $S = (A^t A)^{-} A^t I$, where t indicates the matrix transpose.

An important attribute of the photopolarimeter of the present invention is that it can be adapted to perform time-resolved spectropolarimetry. As previously mentioned and illustrated in FIG. 2, this may be achieved by replacing each detector with a CCD detector array.

The spectrophotopolarimeter of this first embodiment of the present invention differs from that of Todorov and Nikolova in three important respects. First, the spectrophotopolarimeter of the present invention employs only one grating instead of two. In addition, this grating is of the conventional construction, e.g., a reflective metallic, ruled or holographic, grating which is widely available commercially as an off-the-shelf item. Finally, the operation of the polarimeter of the present invention in the conical diffraction regime offers the possibility of eliminating any additional linear polarizers.

According to a second aspect of the present invention, a Stokes-parameter spectrophotopolarimeter based on planar grating diffraction is provided. As already noted, substantial improvement in the measurement precision and accuracy of the photopolarimeter of the first embodiment of the present invention may be attained by inserting linear (e.g. dichroic sheet) polarizers in at least some of the diffracted orders. However, if polarizers are introduced into photopolarimeter then the conical diffraction geometry is no longer essential for polarization analysis. Therefore, planar diffraction may be more conveniently employed with the grating placed in the conventional spectrometer orientation with its lines perpendicular to the plane of incidence.

Figure 6:
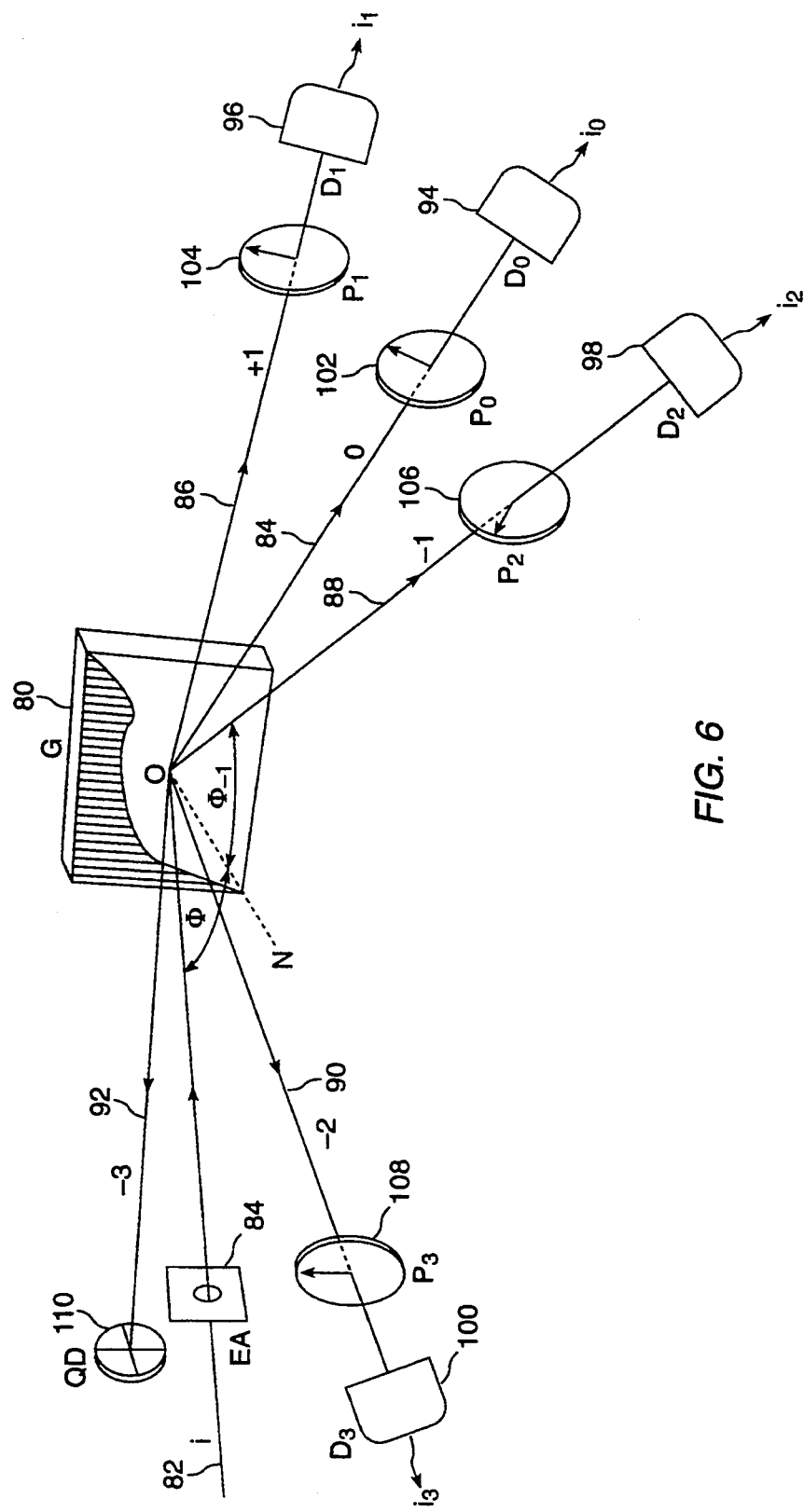
FIG. 6 is a diagram of a division-of-amplitude photopolarimeter based on planar grating diffraction according to a second aspect of the present invention.

Referring now to FIG. 6, a diagram is presented showing a planar-grating-diffraction division-of-amplitude photopolarimeter according to the present invention which employs this simpler geometry and will be understood to possess several advantages over the first embodiment of the invention described herein.

A conventional diffraction grating 80 is utilized in a conventional spectrometer orientation such that an incident light beam 82, after passing through an entrance aperture 84, strikes diffraction grating 80 at a point O on a surface thereof. Unlike the first embodiment of the present invention, the diffraction grating 80 and incident beam 82 in the photopolarimeter of the embodiment are oriented such that the plane of incidence of the incident light beam (a plane defined by the line of the incident wave vector and the line O-N normal to the diffraction grating 80) is normal to the grating lines of diffraction grating 80. In this orientation, all of the diffracted orders will lie in the plane of incidence.

The incident beam 82 strikes the grating 80 at an incident angle $\Phi$ and produces a plurality of diffracted orders. The presently preferred range of incidence angle $\Phi$ is between about 45° and 65°. For the purpose of explaining the present embodiment of the invention, five diffracted orders are shown. The 0th order is shown at reference numeral 84 and lies at an angle $\Phi$ from normal O-N. The $+1$, $-1$, $-2$, and $-3$ diffracted orders are shown at reference numerals 86, 88, 90, and 92, respectively, and all lie within the plane of incidence.

As in the embodiment described with reference to FIG. 2, the photopolarimeter of the present embodiment includes photodetectors for calculating the Stokes parameters. Thus, photodetectors 94, 96, 98, and 100 are shown, respectively intercepting the $+1$, 0, $-1$, and 2, refracted orders. Photodetectors 94, 96, 98, and 100 may be the same type of detectors used in the first embodiment of the invention.

While, in the first embodiment, the placing of polarizing elements in the paths of the refracted orders was optional, in the embodiment shown in FIG. 6, linear polarizing elements 102, 104, 106, and 108 are placed between the diffraction grating 80 and photodetectors 94, 96, 98, and 100, respectively. According to a presently operating embodiment, linear polarizing elements 102, 104, 106, and 108 may be dichroic sheet polarizers (e.g., such as available from Polaroid).

As shown in FIG. 6, one of the diffracted orders may be used to provide system alignment in this embodiment of the present invention. A quadrant detector 110 is shown in the path of the $-3$ order. The use of quadrant detectors for alignment is well known in the art. An error signal produced by quadrant detector 110 may be fed to a conventional servo system to adjust the position of the incident beam 82 or the diffraction grating 80.

Planar diffraction has several advantages over conical diffraction. Use of planar diffraction permits a more compact instrument geometry because all the diffracted beams and the respective detectors can be disposed in one plane. In addition, since all diffracted orders will lie within the plane of incidence, linear detector arrays may be used in place of two-dimensional CCD arrays in multiwavelength spectroscopic applications, leading to a substantial reduction in instrument cost.

Figure 7:
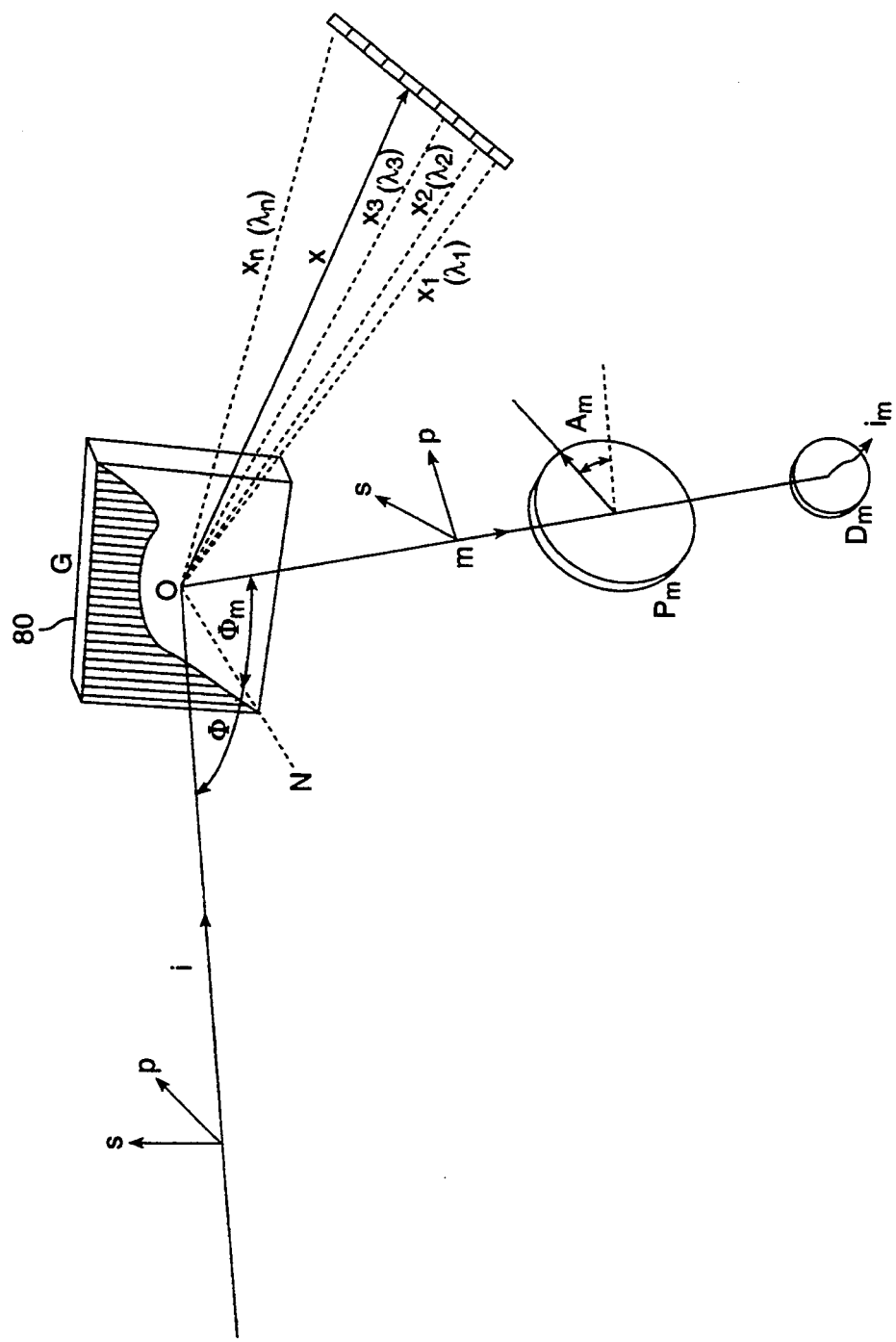
FIG. 7 is a diagram showing the parameters and angles involved in the detection of the mth diffracted order from the planar-grating-diffraction division-of-amplitude photopolarimeter of FIG. 6, and further showing use of a linear detector array.

FIG. 7 is a diagram which introduces the parameters and angles involved in the detection of the m-th diffracted order in the planar-grating-diffraction division-of-amplitude photopolarimeter of FIG. 6. FIG. 7 also illustrates the use of a linear array photodetector including a plurality of individual detectors disposed along a linear axis located in the plane of incidence and positioned such that a given diffracted order beam will strike a detector in the array over a selected range of input light wavelengths. The use of such a linear detector array is illustrated diagrammatically by the division of the linear array into discrete detectors located in the path of a diffracted order beam x from incident light having wavelengths $\lambda_1$, $\lambda_2$, (shown as dashed lines). This arrangement allows the instrument to operate over a selected range of wavelengths.

The directions marked p and s in FIG. 7 are parallel and perpendicular to the plane of incidence and also identify the linear eigenpolarizations of reflection in the planar diffraction geometry. The diffraction of the mth order is completely described by three parameters: $r_m$, the power reflectance or diffraction efficiency for incident unpolarized or circularly polarized light, and the ellipsometric angles $\Psi_m$ and $\Delta_m$ which determine the ratio of complex far-field p and s reflection (or diffraction) coefficients for the same order. Ellipsometric angles are discussed in R. M. A. Azzam and N. M. Bashara, Ellipsometry and Polarized Light, North-Holland, Amsterdam 1987.

As shown in FIG. 7, the linear polarizer (or analyzer) $P_m$ is oriented with its transmission axis at an azimuth $A_m$ measured from the plane of incidence. As in the first embodiment of the invention disclosed herein, the output current signal $i_m$ of the mth photodetector $D_m$ is still given by Eq. (1), where the mth projection vector $a_m$ is now given by $$a_m = (k_m r_m/2)[(1-\cos 2\Psi_m \cos 2A_m)(\cos 2A_m - \cos 2\Psi_m)(\sin 2A_m \sin 2\Psi_m \cos \Delta_m)(\sin 2A_m \sin 2\Psi_m \sin \Delta_m)] \quad (7)$$

where $k_m$ is the responsivity of the mth detector and an ideal polarizer is assumed.

The assumption of an ideal polarizer is for analytical convenience only. The operation of the planar-grating diffraction division-of-amplitude photopolarimeter of FIG. 6, however, is not significantly dependent on the actual properties of the polarizers used. Such properties are absorbed in the instrument matrix, which is determined by calibration and not by calculation.

As an example, assume that four diffracted orders are detected. The instrument matrix A then consists of four rows each of the form given by Eq. (7). For the general case the determinant of the instrument matrix det A is much too involved to be presented here. For the purpose of illustration, if it is assumed that the polarizers are oriented at the uniformly distributed azimuths $A_0 = 0$, $A_1 = 45°$, $A_2 = 90°$, and $A_3 = 135°$, the instrument matrix is considerably simplified and its determinant reduces to $$\det \underline{A} = (1/8)\left(\prod_{q=0}^{4} k_q r_q\right)(1 - \cos 2\psi_0)(1 + \cos 2\psi_2) \times \quad (8)$$

$$(\sin 2\psi_1)(\sin 2\psi_3) \sin(\Delta_1 - \Delta_3).$$

In general det $A \neq 0$ and the instrument matrix is nonsingular. Singularities occur when any of the multiplied factors in Eq. (8) is accidentally zero. These singularities may be conveniently grouped as follows: (1) if the diffraction efficiency $r_m$ of any order or the responsivity of any detector $k_m$ is zero, this obviously leads to the loss of one signal and the full stokes vector cannot be determined; (2) the 0th order is purely s polarized ($\Psi_0 = 0$) or the 2nd order is purely p polarized ($\Psi_2 = 90°$); (3) the p or s polarization is suppressed in the 1st or 3rd order, i.e. $\Psi_1$ or $\Psi_3 = 0°$ or 90° and (4) the differential reflection phase shifts $\Delta_1$ and $\Delta_3$ of the 1st and 3rd orders happen to be equal or differ by $\pm 180°$.

For a monochromatic or quasimonochromatic photopolarimeter operating at a given wavelength, all of the singularities listed above are readily avoidable. However, when operation over a range of wavelengths is anticipated (with linear detector arrays), one or the other of the above singularities may occur at discrete wavelengths. Even those can be avoided by appropriate design.

If a polarizer is removed from one of the diffracted orders, the associated projection vector is reduced from that given by Eq. (7) to the following form:

$$\underline{a}_m = (k_m r_m/2)[1 - \cos 2\Psi_m \ 0 \ 0]. \quad (9)$$

The corresponding instrument matrix simplifies accordingly. To avoid rendering the matrix singular, at most two polarizers can be removed. Put differently, the minimum number of polarizers that can be employed in the planar-grating-diffraction division-of-amplitude photopolarimeter (to be placed in distinct orders) is two. For specificity, let the two polarizers be placed in the 0th and 2nd diffracted orders, at azimuths $A_0$ and $A_2$, respectively, and let no polarizers be present in the 1st and 3rd diffracted orders. The determinant of the instrument matrix in this case is given by $$\det \underline{A} = \quad (10)$$

$$(1/8)\left(\prod_{q=0}^{4} k_q r_q\right)(\sin 2A_0 \sin 2A_2)(\sin 2\psi_0 \sin 2\psi_2)(\cos 2\psi_1 -$$

$$\cos 2\psi_3)[\sin(\Delta_0 - \Delta_2)]$$

In general det $A \neq 0$ and the instrument matrix is nonsingular. Singularities occur if any of the multiplied factors in Eq. (10) is accidentally zero. Besides the obvious singularities that arise from zero diffraction efficiency or zero detector responsivity, the other singularities occur when: (1) the transmission axis of either polarizer is in or normal to the plane of incidence ($A_m = 0$ or 90°, $m = 0$ or 2); (2) the diffraction of the p or s polarization is suppressed in the 0th or 2nd order ($\Psi_0$ or $\Psi_2 = 0°$ or 90°) (i.e., the diffraction grating functions as a linear polarizer in one of these orders); (3) the (ellipsometric) parameter psi is the same for the 1st and 3rd orders (the two beams without polarizers), i.e. $\Psi_1 = \Psi_3$; and (4) Finally, the differential reflection phase shifts $\Delta_0$ and $\Delta_2$ (for the two beams with polarizers) are equal or differ by $\pm 180°$.

Again the above listed singularities can assuredly be avoided in a monochromatic design. The essential psi's and delta's can be measured by ellipsometry and the instrument matrix, as determined by calibration, is checked to be nonsingular. Those of ordinary skill in the art will recognize that, for a grating with well-defined characteristics, the instrument matrix can also be calculated from electromagnetic theory, as described in M. G. Moharam and T. K. Gaylord, Three-dimensional vector coupled-wave analysis of planar grating diffraction, J. Opt. Soc. Am., Vol. 73, pp. 1105–1112 (1983). For operation over a spectral range, one or the other of the singularities (2)–(4) listed above may occur at discrete wavelengths.

A planar-grating-diffraction division-of-amplitude photopolarimeter has been constructed and operated in the planer diffraction regime with $\alpha=90°$ and $\Phi=45°$ using the same 600 groove/mm grating at 633-nm wavelength. The grating equation, sin $\Phi_m=0.7071+0.3797$ m, where m is the order of diffraction, predicts five diffracted beams for m=0, −1, −2, −3, and −4 that appear at angles of 45°, 19.11°, −3.00°, −25.59°, and −54.26°, measured from the normal to the grating surface. A negative angle indicates that the corresponding diffracted order propagates on the same side of the normal as the incident beam.

Figure 8:
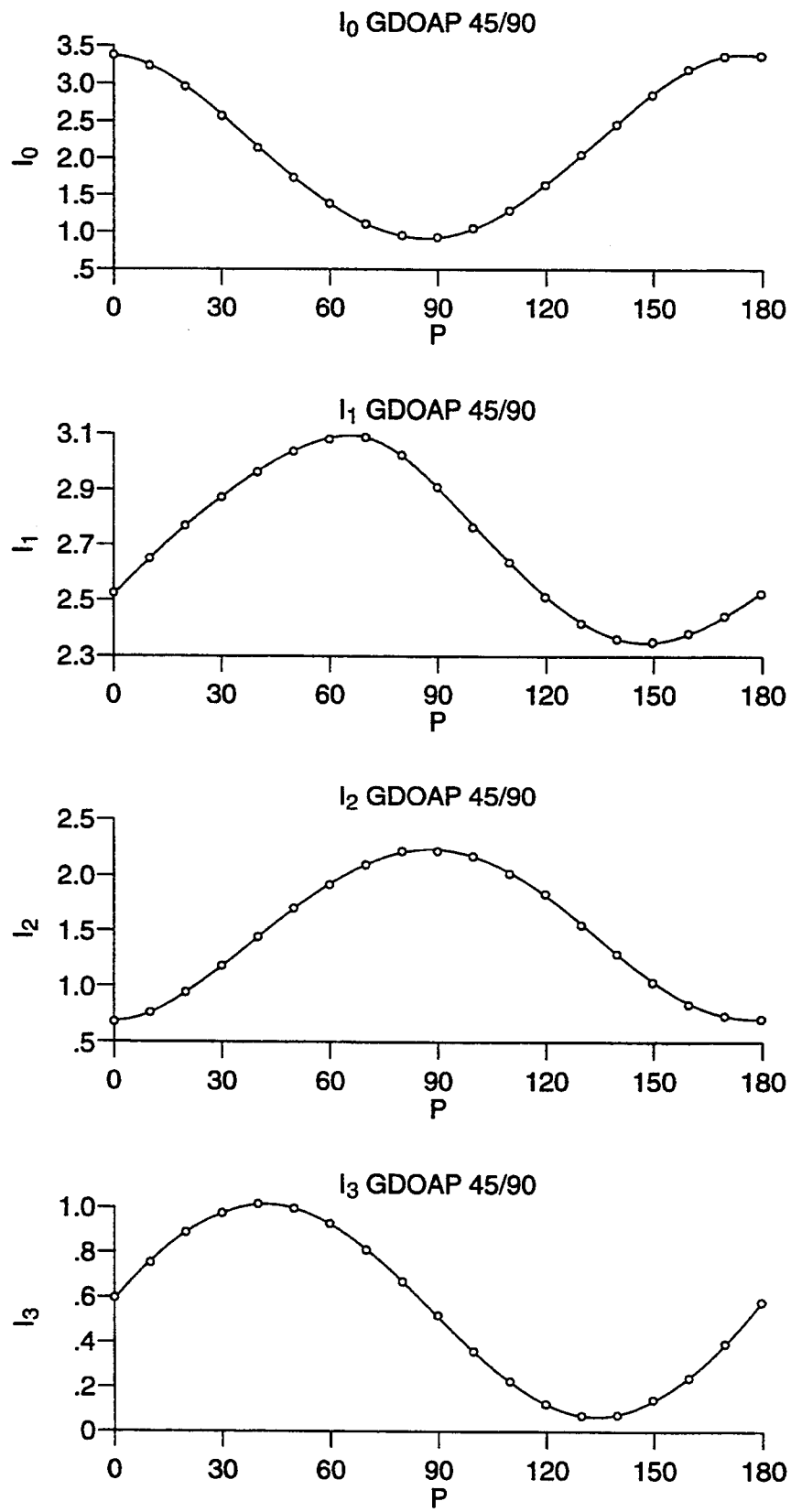
FIG. 8 is a diagram showing a representation of the results of the calibration procedure which determines the first three columns of the instrument matrix A of an actual planar-grating-diffraction division-of-amplitude photopolarimeter of FIG. 6.

The first four of these orders are used for polarimetric analysis and are numbered without the minus sign. The 5th beam (m=−4) is used for alignment. Sheet polarizers $P_1$ and $P_3$, are placed in the 1st- and 3rd-order beams only. The polarizer $P_1$ is oriented so as to maximize the differential response of photodetector $D_1$ to the incident right- and left-handed circular polarization states. Likewise, the polarizer $P_3$ is oriented to maximize the differential response of photodetector $D_3$ to the incident orthogonal linear polarizations at the 45° and −45° azimuths. PIN photodiodes are used as the detectors and their outputs are amplified and then processed using a 12-bit analog-to-digital (A/D) converter and an Online personal computer. The instrument is calibrated using a method already described in the literature (Azzam and Lopez, already cited) and the resulting matrix is given below $$\underline{A} = \begin{pmatrix} 2.112 & 1.185 & -0.168 & 0.005 \\ 2.690 & -0.168 & 0.307 & 2.357 \\ 1.147 & -0.908 & 0.125 & 0.010 \\ 0.506 & 0.051 & 0.454 & -0.188 \end{pmatrix} \quad (11)$$

det A=−3.727 and the matrix is far from singular. The lengths of the normalized projection vectors are 0.567, 0.886, 0.798, and 0.976 for the 0th, 1st, 2nd, and 3rd orders, respectively. (The second number, which should have been closer to 1, indicates that the polarizer $P_1$ is not of a very good quality.) The data that produced the first three columns of A is shown in FIG. 8. The diamonds are the experimental points and the continuous lines are the best-fit theoretical curves that include dominant cos2P and sin2P terms plus much smaller cos4P and sin4P terms where P is the azimuth of the linear polarizer in the incident beam. The residual rms error is of the order of 0.001.

The instrument's ability to determine a broad range of elliptical polarization states has been tested. The prototype grating division-of-amplitude photopolarimeter in the planar configuration measures the normalized stokes parameters with a precision of the order of 0.001, which is determined primarily by the digitization error associated with the 12-bit A/D converter.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An instrument for measuring the state of polarization of light as determined by the four Stokes parameters, comprising:
   a diffraction grating having a surface including a plurality of parallel grating grooves thereon, said grating having a spatial frequency selected to produce at least four diffracted orders;
   a source of an incident light beam whose state of polarization is to be measured, said source oriented such that said incident light beam is directed at said grating so as to form an oblique incidence angle with said surface and such that said grating grooves are inclined at an inclination angle greater than 0° and less than 90° with respect to a plane of incidence defined by said light beam and a line normal to said surface at the point of incidence of said light beam on said surface;
   at least four photodetectors, each of said photodetectors positioned on the surface of an imaginary cone defining conical diffraction of said incident light beam from said grating cone so as to intercept a different diffracted order from said incident light beam; and
   calculating means responsive to said photodetectors for determining the four Stokes parameters descriptive of the polarization state of said light beam.

2. The instrument for measuring the state of polarization of light of claim 1, wherein said inclination angle is between about 30° and 60°.

3. The instrument for measuring the state of polarization of light of claim 1, wherein said inclination angle is about 45°.

4. The instrument for measuring the state of polarization of light of claim 1, further including linear polarizing means disposed between said grating and at least one of said photodetectors, said linear polarizing means positioned along the axis on which said at least one photodetector is located.

5. An instrument for measuring the state of polarization of light as determined by the four Stokes parameters, comprising:
   a diffraction grating having a surface including a plurality of parallel grating grooves thereon, said grating having a spatial frequency selected to produce at least four diffracted orders;
   a source of an incident light beam whose state of polarization is to be measured, said source oriented such that said incident light beam is directed at said grating so as to form an oblique incidence angle with said surface and such that said grating grooves are perpendicular to a plane of incidence defined by said light beam and a line normal to said surface at the point of incidence of said light beam on said surface;
   at least four photodetectors, each of said photodetectors positioned so as to intercept a different diffracted order from said incident light beam;
   linear polarizing means disposed between said diffraction grating and said photodetectors in the paths of at least two of said diffracted orders; and
   calculating means responsive to said photodetectors for determining the four Stokes parameters descriptive of the polarization state of said light beam.

6. The instrument for measuring the state of polarization of light of claim 5, wherein said linear polarizing means are disposed between said diffraction grating and said photodetectors in the paths of all of said diffracted orders.

7. A conical-grating-diffraction division-of-amplitude spectrophotopolarimeter, comprising:
   a diffraction grating having a surface including a plurality of parallel grating grooves thereon, said grating having a spatial frequency selected to produce at least four diffracted orders;

a source of an incident light beam of unknown polarization having wavelengths within a range of interest, said source oriented such that said incident light beam is directed at said grating so as to form an oblique incidence angle with said surface and such that said grating grooves are inclined at an inclination angle greater than 0° and less than 90° with respect to a plane of incidence defined by said light beam and a line normal to said surface at the point of incidence of said light beam on said surface;

at least four area photodetector arrays, each of said arrays having individual detector elements and positioned so as to intersect the paths of a different diffracted order from incident light beams having wavelengths within said range; and calculating means responsive to said photodetector arrays for determining the four Stokes parameters descriptive of the polarization state of said light beam.

8. The conical-grating-diffraction division-of-amplitude spectrophotopolarimeter of claim 7, wherein said inclination angle is between about 30° and 60°.

9. The conical-grating-diffraction division-of-amplitude spectrophotopolarimeter of claim 7, wherein said inclination angle is about 45°.

10. The conical-grating-diffraction division-of-amplitude spectrophotopolarimeter of claim 7, further including linear polarizing means disposed between said grating and at least one of said photodetectors, said linear polarizing means positioned along the axis on which said at least one photodetector is located.

11. A planar-grating-diffraction division-of-amplitude spectrophotopolarimeter, comprising:

a diffraction grating having a surface including a plurality of parallel grating grooves thereon, said grating having a spatial frequency selected to produce at least four diffracted orders;

a source of an incident light beam of unknown polarization having wavelengths within a range of interest, said source oriented such that said incident light beam is directed at said grating so as to form an oblique incidence angle with said surface and such that said grating grooves are perpendicular to a plane of incidence defined by said light beam and a line normal to said surface at the point of incidence of said light beam on said surface;

at least four linear photodetector arrays, each of said arrays having a plurality of detector elements disposed on a linear axis, the linear axis of each of said arrays positioned such that individual ones of said detector elements intercept the path of a different diffracted order from incident light beams having wavelengths within said range;

linear polarizing means disposed between said diffraction grating and said arrays in the paths of at least two of said diffracted orders; and calculating means responsive to said photodetector arrays for determining the four Stokes parameters descriptive of the polarization state of said light beam.

12. The planar-grating-diffraction division-of-amplitude spectrophotopolarimeter of claim 11, wherein said linear polarizing means are disposed between said diffraction grating and said arrays in the paths of all of said diffracted orders.

13. A method for simultaneously producing a plurality of electrical signals, each of which is a linear combination of all four Stokes parameters of a light beam, including the steps of:

directing the light beam onto a diffraction grating to obtain at least four diffracted orders, said incident beam oriented such that the grating grooves are oriented at an angle greater than 0° but less than 90° to the plane of incidence of said incident beam of light;

simultaneously detecting the intensity of each said at least four diffracted orders and generating output electrical signals related thereto; and processing said output electrical signals to determine the four Stokes parameters of the light beam.

14. A method for simultaneously producing a plurality of electrical signals, each of which is a linear combination of all four Stokes parameters of a light beam, including the steps of:

directing the light beam onto a diffraction grating to obtain at least four diffracted orders, said incident beam oriented such that the grating grooves are perpendicular to the plane of incidence of said incident beam of light;

simultaneously detecting the intensity of each said at least four diffracted orders in the presence of a linear polarizing element in at least two of said orders and generating output electrical signals related thereto; and; and processing said output electrical signals to determine the four Stokes parameters of the light beam.

15. An instrument for measuring the state of polarization of an input light beam comprising:

a diffraction grating having a surface including a plurality of parallel grooves thereon, said grating having a spatial frequency selected to produce at least four diffracted orders;

means for directing the input light beam to said surface so as to form an oblique incidence angle between the input light beam and said surface so that said grooves are inclined at an inclination angle greater than 0° and less than 90° with respect to a plane of incidence defined by the input light beam and a line normal to said surface at the point of incidence of the input light beam on said surface;

at least four photodetectors for producing output signals, each of said photodetectors positioned on the surface of an imaginary cone defining conical diffraction of said incident light beam from said grating cone so as to intercept a different diffracted order from said incident light beam;

linear polarizing means disposed between said grating and said photodetectors in the paths of at least one of said diffracted orders;

calculating means responsive to said output signals for solving simultaneous linear algebraic equations determined from said output signals; and output means responsive to said calculating means for outputting the four Stokes parameters descriptive of the polarization state of the input light beam.

* * * * *